United States Patent [19]

Pahmeier et al.

[11] Patent Number: 4,724,084
[45] Date of Patent: Feb. 9, 1988

[54] SYSTEM FOR REMOVING TOXIC ORGANICS AND METALS FROM MANUFACTURING WASTEWATER

[75] Inventors: Max C. Pahmeier, Renton; Joseph D. Edwards, Seattle, both of Wash.

[73] Assignee: The Boeing Company, Seattle, Wash.

[21] Appl. No.: 845,546

[22] Filed: Mar. 28, 1986

[51] Int. Cl.⁴ .................................................. C02F 1/72
[52] U.S. Cl. ..................................... 210/709; 210/712; 210/718; 210/721; 210/725; 210/727; 210/759; 210/909; 210/912; 210/913
[58] Field of Search ............... 210/709, 712, 718, 721, 210/722, 725, 726, 727, 912, 913, 909, 759; 204/DIG. 13

[56] References Cited

U.S. PATENT DOCUMENTS

| | | | |
|---|---|---|---|
| 3,171,800 | 3/1965 | Rice et al. | 210/722 |
| 3,846,293 | 11/1974 | Campbell | 210/725 |
| 3,931,007 | 1/1976 | Sugano et al. | 210/724 |
| 4,163,716 | 8/1979 | Turnbull | 210/722 |
| 4,251,361 | 2/1981 | Grimsley | 210/703 |
| 4,314,906 | 2/1982 | Dunn et al. | 210/908 |
| 4,321,143 | 3/1982 | Wilms et al. | 210/721 |
| 4,650,579 | 3/1987 | Harvey et al. | 210/199 |

FOREIGN PATENT DOCUMENTS

| | | | |
|---|---|---|---|
| 1162292 | 1/1964 | Fed. Rep. of Germany | 210/709 |
| 54-44353 | 4/1979 | Japan | 210/721 |
| 58-174286 | 10/1983 | Japan | 210/759 |
| 2056962 | 3/1981 | United Kingdom | 210/721 |

Primary Examiner—Peter Hruskoci
Attorney, Agent, or Firm—Bruce A. Kaser

[57] ABSTRACT

A system (10) is provided for treating wastewater discharged from airplane manufacturing operations. The system (10) includes a variety of sequential chemical adjustments to the waste stream which can remove substantially all toxic organics and heavy metals therefrom.

14 Claims, 9 Drawing Figures

SYSTEM FOR REMOVING TOXIC ORGANICS AND METALS FROM MANUFACTURING WASTEWATER

DESCRIPTION

1. Technical Field

This invention generally relates to treatment of wastewater before it is discharged directly into a sanitary sewer. More particularly, this invention relates to a system which treats wastewater effluent resulting from certain manufacturing operations wherein toxic organics and metals are present.

2. Background Art

Airplane manufacturing operations produce wastewater which cannot be discharged directly into a sanitary sewer because the wastewater contains various toxic organics and metals. For example, airplane paint stripping operations generate 100,000 to 150,000 gallons of wastewater for every airplane processed. This wastewater contains phenol and methylene chloride organic compounds, and further includes metals such as chromium; zinc, copper, nickel, cadmium and lead. Certain paint stripping compounds also contain various surfactants and thickeners which are also present in the wastewater. In addition, rinse water from airplane prepaint operations contains soaps and surfactants from alkaline cleaners, chromium from alodine solutions, and toluene from solvent wiping operations. Air wash water from an airplane paint booth contains paint booth treatment chemicals and metals from paint solids which are collected in the water. Lastly, rinse water from airplane plating operations contains certain amounts of chromium, nickel, zinc, cadmium and copper.

The disposal of wastewater containing the above-identified organics and metals is regulated by environmental law. Recent enactment of new environmental laws, which set lower limits on the amounts of toxic organics and metals which can be dumped into a sewer, has compounded problems associated with disposing this type of wastewater. For this reason, a need has arisen to provide more effective waste treatment processes in order to comply with the newly enacted and more stringent laws. The invention disclosed herein provides such a process.

DISCLOSURE OF THE INVENTION

The present invention provides a system for removing such toxic organics as phenol, methylene chloride, and toluene from a water waste stream. Further, the disclosed system also removes other pollutants such as metals including cadmium, chromium, copper, lead, nickel, silver and zinc. The invention provides a two-stage treatment process for removing these metals and organics from the waste stream, and the process is generally defined below:

The pH of the waste stream effluent from a manufacturing process is first adjusted to approximately 5.0. Then, ferrous sulfate ($FeSO_4 7H_2O$) is continuously added to the waste stream in an amount based upon the initial phenol concentration in the waste stream, or alternatively, in a minimum precalculated dose. Ferrous sulfate is added to provide iron (Fe) ions which catalyze hydrogen peroxide ($H_2O_2$), the addition of which follows the addition of the ferrous sulfate. A solution of 50% hydrogen peroxide may be added, for example, the amount of which is also based on the initial phenol concentration.

The above addition of ferrous sulfate and hydrogen peroxide occurs in a mixer reactor, and the iron-catalyzed hydrogen peroxide oxidizes the phenol in the waste stream. Then, the waste stream is clarified. This is accomplished by adjusting the pH of the waste stream to within a range of 8.5 to 9.5 by using lime. This is followed by adding a polymer to the waste stream which causes flocculation thereby producing a certain amount of sludge. The sludge is thickened and removed and this completes the first stage of the treatment process.

After sludge removal, the second stage of the treatment process is begun by once again adjusting the pH of the waste stream to 5.0. Approximately 1000 ppm ferrous sulfate is again added to the waste stream, which is followed by continuously adding hydrogen peroxide, in an amount based on either oxidation reduction potential measurements of the waste stream, or the amount of phenol concentration in the waste stream. This second addition of ferrous sulfate and hydrogen peroxide is done in another mixer reactor. After leaving this mixer reactor, the pH of the waste stream is again adjusted to 8.5 to 9.5, which is followed by addition of a polymer. The waste stream is then once again clarified in the same manner as was described above, resulting in additional production of sludge, which is removed from the waste stream. The clarified waste stream effluent is then air stripped for the purpose of lowering the concentration of any remaining volatile organics in the waste stream, thus completing the second and final stage of waste stream treatment.

By treating a waste stream in the above-described manner, the amount of toxic organics and metals contained therein can be reduced to acceptable levels compatible with current environmental laws. The waste stream can then be dumped directly into a sewer. Although the above treatment process is particularly suitable for treating wastewater effluent from aircraft manufacturing operations, it should be appreciated that the above system could also be used for treating wastewater effluent from other manufacturing operations as well. An advantage to the above system is that it is adaptable for treating wastewater resulting from both airplane painting operations and from plating operations, which also occur during the manufacture of an aircraft. For example, wastewater effluent from a plating operation can be input directly into the waste stream during the second stage treatment process. Specifically, plating wastewater can be input into the system by first adjusting its pH to approximately 4.0, and then by adding ferrous sulfate, which is followed by inputing the plating line wastewater into the second stage treatment process after the second stage mixing (wherein phenol is oxidized by iron-catalyzed hydrogen peroxide), but before clarification.

As would be apparent to a person skilled in the art, practical implementation of the above-disclosed two-stage treatment process into an actual working system would require suitable detection instrumentation and recycle capabilities for various parts of the process. In addition, a specially designed mixer reactor is disclosed herein which permits continuous addition of ferrous sulfate and hydrogen peroxide to the waste stream in the manner described above.

BRIEF DESCRIPTION OF THE DRAWINGS

In the drawings, like reference numerals and letters refer to like parts throughout the various views, and wherein.

BEST MODE FOR CARRYING OUT THE INVENTION

Figure 1:
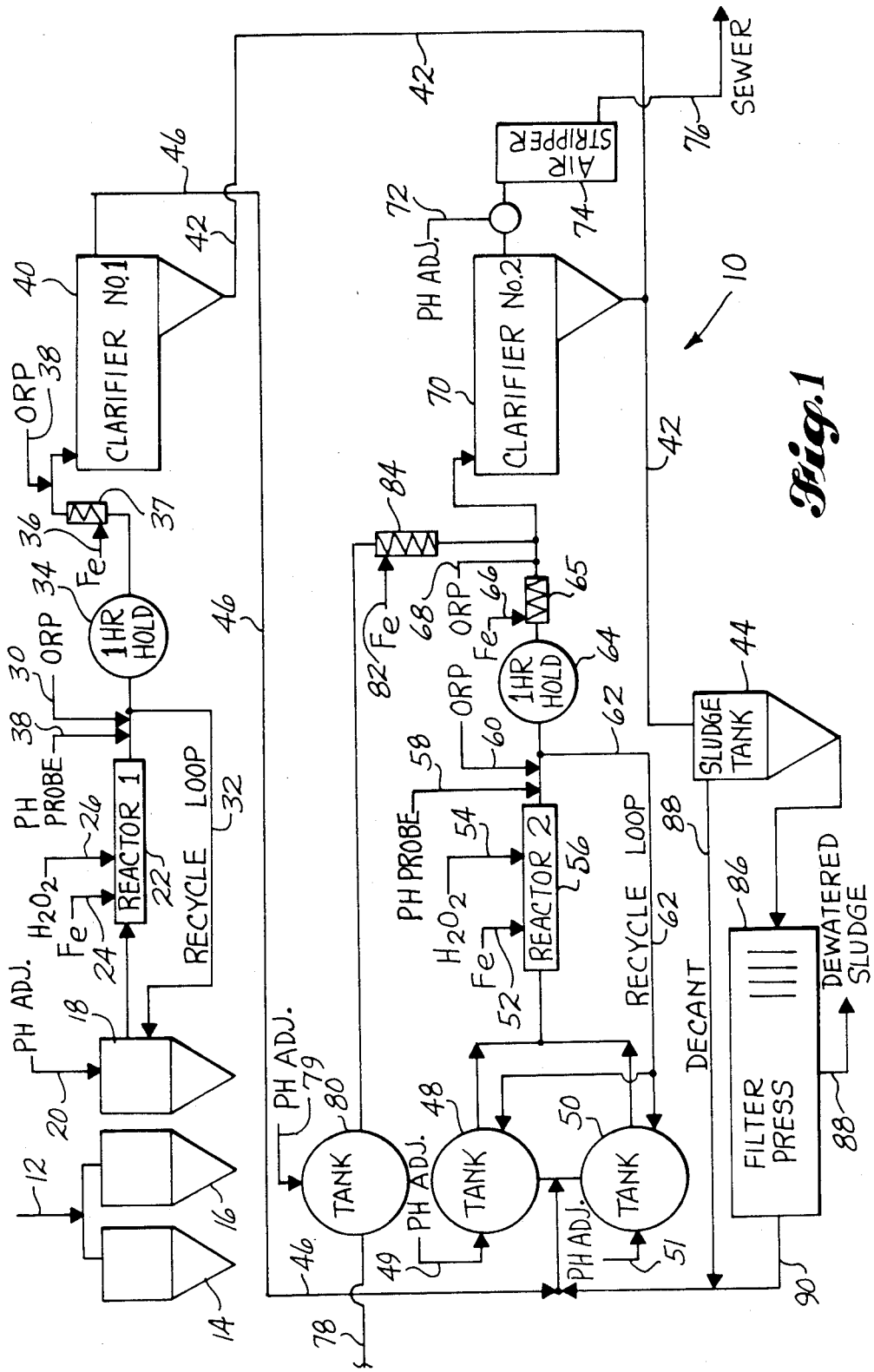
FIG. 1 is a schematic view of a wastewater treatment system constructed in accordance with a preferred embodiment of the invention.

Referring now to the drawings, and first to FIG. 1, therein is shown schematically at 10 a waste water treatment system constructed in accordance with a preferred embodiment of the invention. A water waste stream, including any of the toxic organics and metals described previously, is input into the system at 12. The waste stream is first held in one of two holding tanks 14, 16. Then, the waste stream is transferred to a third holding tank 18 where its pH is adjusted to approximately 5.0, as shown at 20. By way of example, pH adjustment is accomplished by adding either lime or hydrosulfuric acid to make the waste stream more basic or acidic, respectively.

After pH adjustment, ferrous sulfate and hydrogen peroxide are continuously added to the waste stream in a mixer reactor 22 as shown at 24, 26. The ferrous sulfate is first added in the reactor 22 in an amount based on the initial phenol concentration in the waste stream. For example, the ratio of ferrous sulfate to phenol should typically be approximately 3 to 1. However, a minimum amount of ferrous sulfate must be added so that approximately 1200 ppm of iron ions (Fe) Fe will be input into the stream if a continuous waste stream of approximately 50 gallons per minute is to be treated.

The hydrogen peroxide is added into the mixer reactor 22 after the ferrous sulfate. The iron in the ferrous sulfate catalyzes the hydrogen peroxide causing it to oxidize the phenol in the waste stream. As would be familiar to a person skilled in the art, mixing hydrogen peroxide and ferrous sulfate in this manner is a potentially volatile process. Therefore, the mixer reactor 22 is specially designed to accomodate this mixing and the specific design of the reactor 22 will be further described later.

The pH and the amount of unoxidized hydrogen peroxide is sensed at 28 and 30, respectively, shortly after the waste stream leaves the mixer reactor 22. Oxidation of the hydrogen peroxide can be sensed by measuring its oxidation reduction potential (ORP), a process which would be well familiar to a person skilled in the art. Hereafter, "ORP" as described herein and shown in the drawings will denote oxidation reduction potential.

If the hydrogen peroxide is not sufficiently oxidized, it may be recycled as shown at 32 to the third holding tank 18. Otherwise, it is held in a holding tank 34 for approximately one hour. This ensures a maximum amount of phenol will be oxidized. Then, more ferrous sulfate may be added to the waste stream at 36 by means of a mixer 37, to remove any residual hydrogen peroxide that remains after the one hour holding period. If no residual hydrogen peroxide is present, then no ferrous sulfate is added at this particular point. The amount of residual hydrogen peroxide is sensed at 38 by ORP measurements.

The waste stream is then transferred to a clarifier 40. In the clarifier, the pH of the waste stream is again adjusted by using lime to a pH ranging between 8.5 to 9.5. This pH adjustment is followed by adding a polymer, which causes flocculation in the waste stream and produces sludge. The sludge, which contains heavy metals, is removed from the clarifier as shown at 42, and is thickened in a sludge tank 44. The remaining liquid effluent from the clarifier 40 is transferred as shown at 46 to one of two holding tanks 48, 50. At this point, the first stage of the treatment process is complete.

To begin the second stage, the pH of the waste stream in holding tanks 48, 50 is once again adjusted to a value of approximately 5.0 as shown at 49, 51. The second stage is generally a repeat of the first stage. Specifically, ferrous sulfate and hydrogen peroxide, as indicated at 52 and 54, are continuously added to the waste stream by means of a second mixer reactor 56. The second reactor 56 is similar in construction and function to the first mixer reactor 22. After leaving the second reactor 56, the pH of the waste stream and oxidation of the hydrogen peroxide in the waste stream are sensed at 58 and 60, respectively. The waste stream may be recycled back to the tanks 48, 50 as shown at 62, if either the pH of oxidation is unacceptable. As in the first stage of the treatment process, the waste stream is held in a tank 64 for about one hour after leaving the second reactor 56. Then, ferrous sulfate may once again be added to the waste stream by means of a mixer 65 as shown at 66, to oxidize any residual hydrogen peroxide. Any of such residual hydrogen peroxide is sensed by ORP measurements at 68. The waste stream is then transferred to a second clarifier 70, wherein lime is first added to adjust the pH of the waste stream, followed by addition of a polymer to cause flocculation. Sludge is removed from the second clarifier 70 to the sludge tank 44. The waste stream effluent from the second clarifier 70 is pH adjusted at 72 to a value of approximately 7.0, and then is processed by an air stripper 74. The air stripper 74 removes any remaining volatile organics from the waste stream such as methylene chloride or toluene. After air stripping, the waste stream is sufficiently treated and is clean for dumping into a sewer 76.

As was indicated above, the system 10 was designed for treating wastewater discharge from airplane painting operations. However, the system 10 may also accomodate wastewater discharge from airplane plating operations. Such wastewater typically contains certain amounts of chromium, nickel, zinc, cadmium and copper. If plating line wastewater is processed, it would be input into the system at 78. This wastewater would first have its pH adjusted to 4.0 as shown at 79 in a holding tank 80. Then, ferrous sulfate 82 is added to the plating line waste stream at 84. The plating line waste stream is then transferred into the second clarifier and is processed in the above-described manner.

As was previously mentioned, sludge is sent to a sludge tank 44. Sludge in the tank 44 is thickened and transferred to a filter press 86. Water effluent from the sludge tank is recycled through the second stage of the system 10 as indicated at 88. The filter press 86 dewaters the sludge and forms it into a fairly solid cake-like material which is removed from the filter press as shown at 88. This material may then be transported to a hazardous waste disposal site. Water effluent from the filter press 86 is recycled through the system 10 as indicated at 90.

Figure 2:
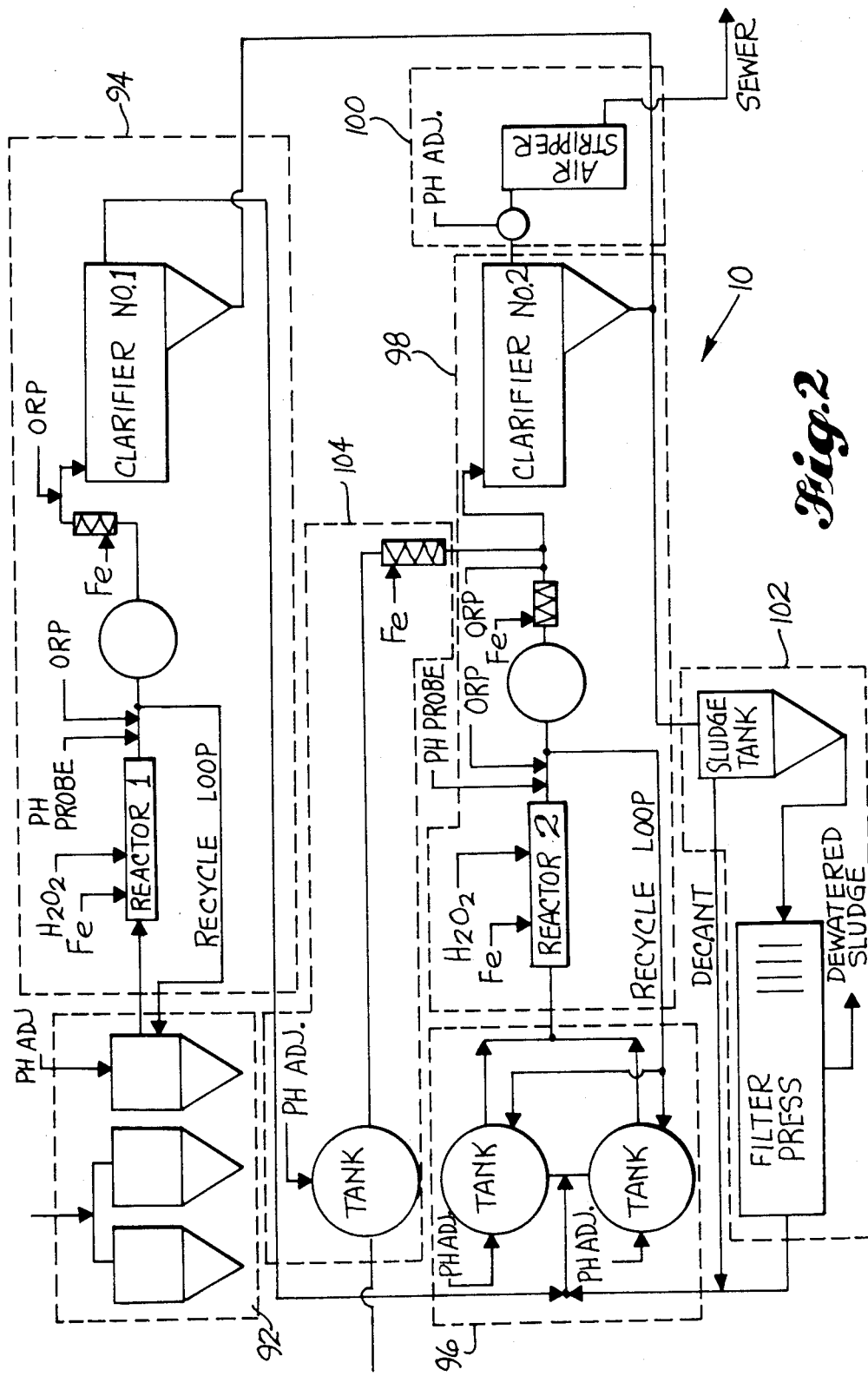
FIG. 2 is a drawing like FIG. 1, but divides the system shown in FIG. 1 into sections generally corresponding to FIGS. 3–9 which follow.

A more detailed embodiment of the system 10 is shown in FIGS. 3–8. Each of these figs. shows a part or section of the system which corresponds generally to the various blocked-out portions in FIG. 2. Referring now to FIG. 2, that portion of the system 10 which is blocked off by dashed lines 92 corresponds generally to FIG. 3. Further, those portions of the system 10 designated by blocked off portions 94, 96, 98, 100, 102, and 104, correspond in a general manner to FIGS. 4–9, respectively.

Figure 3:
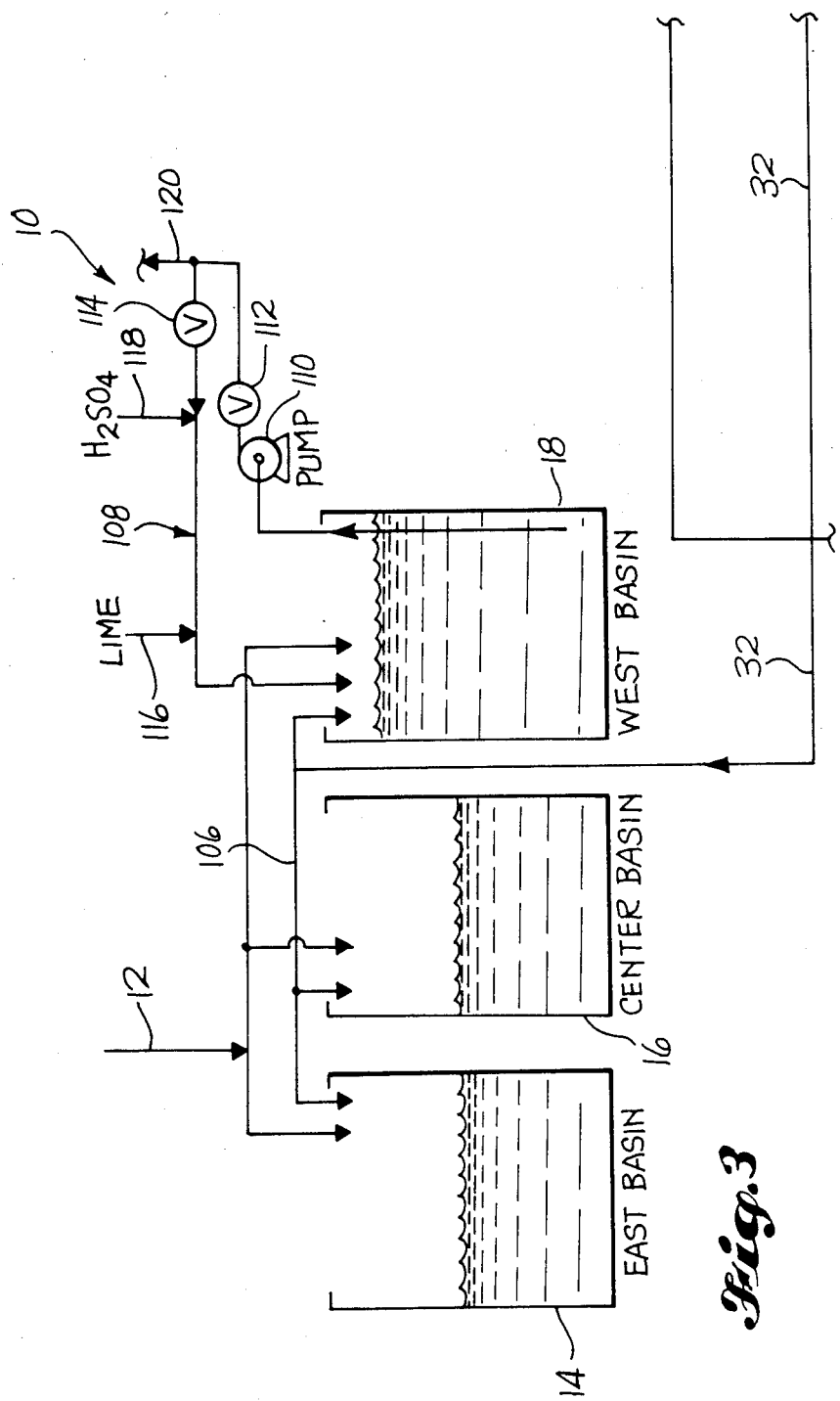
FIG. 3 is a schematic drawing of the upper left-hand corner of FIGS. 1 and 2.

FIG. 3 shows the input of the waste stream at 12 into the three tanks 14, 16, 18. The tanks 14, 16, 18 are interconnected as schematically indicated at 106. Typically, the system 10 will be designed to process a waste stream at a certain flow rate, such as 50 gallons per minute (GPM), for example. At certain times, however, the amount of waste stream effluent from a manufacturing operation may exceed this flow rate. If this is the case, the excess waste stream will be held in one of the two tanks 14, 16 designated in FIG. 3 as either the east or center basin. These tanks 14, 16 are used until the system 10 can accommodate the excess effluent. Otherwise, the effluent flows directly into the tank 18 designated as the west basin in FIG. 3. There, the waste stream is circulated through a loop, generally designated 108, by means of a pump 110 for the purpose of adjusting the pH of the waste stream in the tank 18 to approximately 5.0. Circulation in the loop 108 is suitably controlled by valves 112, 114. As previously mentioned, the pH is adjusted by either adding lime or sulfuric acid ($H_2SO_4$) as shown at 116, 118, respectively. Once the pH is adjusted, the valves 112, 114 are suitably controlled so that pump 110 pumps the pH-adjusted waste stream to the first mixer reactor 22 as shown at 120.

Figure 4:
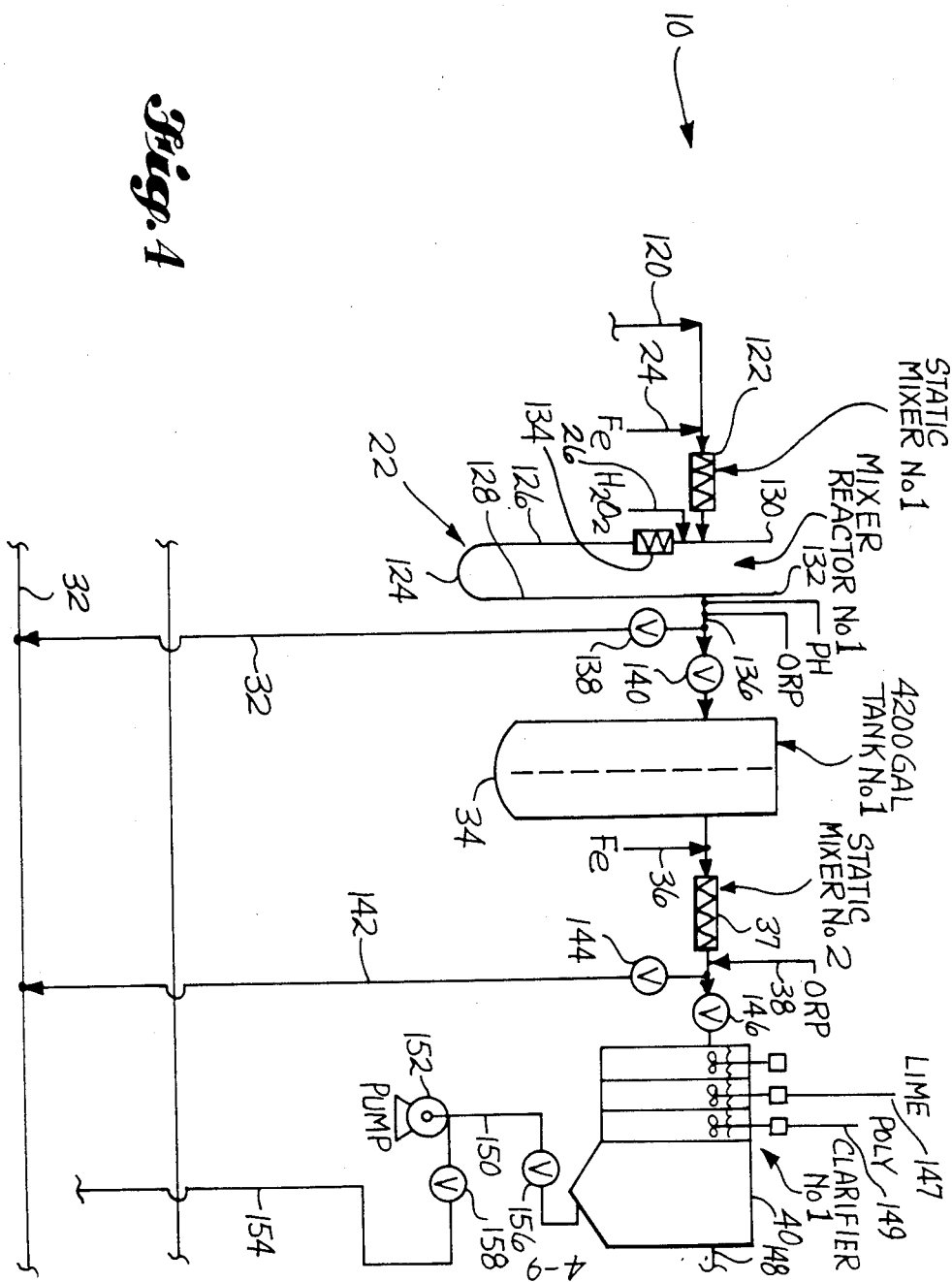
FIG. 4 is a more detailed schematic drawing showing the upper-middle portion of FIGS. 1 and 2.

Directing attention now to FIG. 4, the first mixer reactor is generally shown at 22. As mentioned previously, ferrous sulfate is first added to the waste stream at 24. A static mixer 122, the construction of which would be well familiar to a person skilled in the art, mixes the ferrous sulfate into the waste stream. Then, the waste stream enters the mixer reactor 22. The mixer reactor 22 is made of a continuous U-shaped tube 124 having two upwardly extending vertical portions 126, 128. The diameter of the tube 124 may vary depending on the waste stream flow rate, but may be approximately 14 inches for a flow rate of 50 gpm, for example. Each of the vertical portions 126, 128 may be as high as 30 feet. In preferred form, the tube 124 of made of stainless steel. Each vertical portion 126, 128 is open at its respective upper end 130, 132 to vent the mixer reactor 22. One of the portions 126 is connected to the static mixer 122, in which the ferrous sulfate is mixed into the waste stream. Hydrogen peroxide is input into this tube at 26, and another static mixer 134 is provided in the tube 126 for mixing the hydrogen peroxide into the waste stream.

The waste stream exits the mixer reactor 22 at 136. At this point, the pH of the waste stream and the oxidation of the iron-catalyzed hydrogen peroxide is measured as shown at 30 and 38 (also shown in FIG. 1). If these measurements are undesirable, the waste stream may be recycled or recirculated through loop 32 as shown in FIGS. 4 and 3. Recirculation would be suitably controlled by valves 138 and 140.

As previously mentioned, after the waste stream leaves the first mixer reactor 22, it is held in a tank 34 for approximately one hour. In preferred form, additional recycle capability is provided at 142 if the ORP measurements taken at 38 are undesirable. This recycles the waste stream back into recycle loop 32. This particular recycle is controlled by valves 144 and 146, with valve 146 controlling flow of the waste stream into the clarifier 40. In the clarifier 40, lime 147 and a polymer 149 are added as previously described. The first stage treatment of the waste stream is complete when the waste stream effluent leaves the clarifier 40 at 148. Sludge is removed from the clarifier at 150 by means of a pump 152, which pumps the sludge as shown at 154 to the sludge storage tank 44 (shown in FIG. 8). Valves 156, 158, respectively, are operable to control the pumping of sludge.

Figure 5:
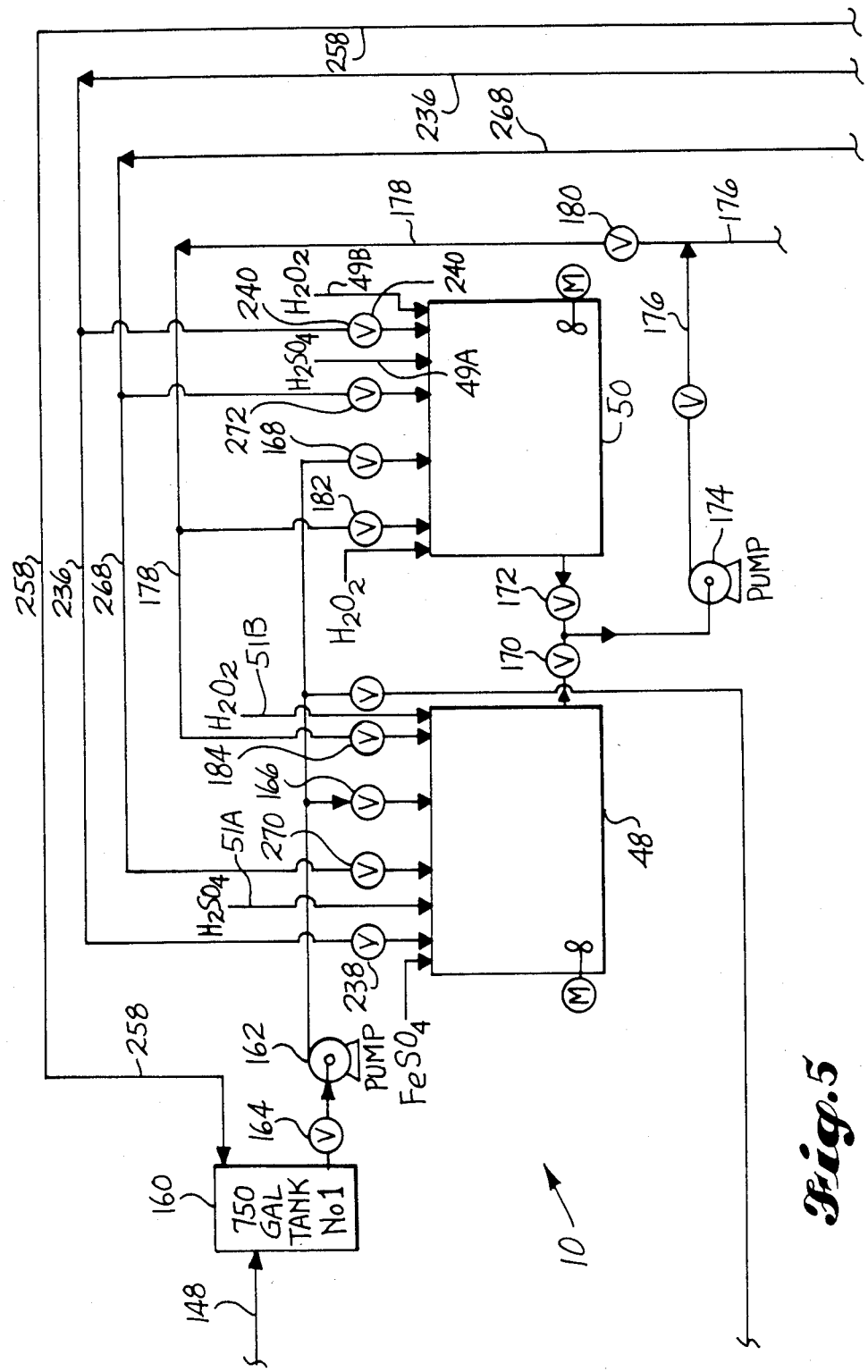
FIG. 5 is a more detailed schematic drawing of the middle left-hand portion of FIGS. 1 and 2.

Referring now to FIG. 5, the waste stream effluent from the first clarifier 40, shown at 148, may be held in another holding tank 160. Afterward, the waste stream is transferred from the holding tank 160 by a pump 162 to either one of two holding tanks 48, 50. A plurality of valves 164, 166, 168, respectively, control the transfer of the waste stream into the holding tanks 48, 50. The pH in the tanks 48, 50 is adjusted by adding either sulfuric acid or hydrogen peroxide as shown at 49a, 49b, and 51a, 51b. Valves 170, 172 control flow of the waste stream from the tanks 48, 50. A pump 174 normally transfers the waste stream from the tanks 48, 50 as shown at 176 to the second mixer reactor 56 shown in FIG. 6. A recycle loop 178 is provided, however, for recirculating the waste stream back into the tanks 48, 50. This recycle loop is controlled by valves 180, 182, and 184.

Figure 6:
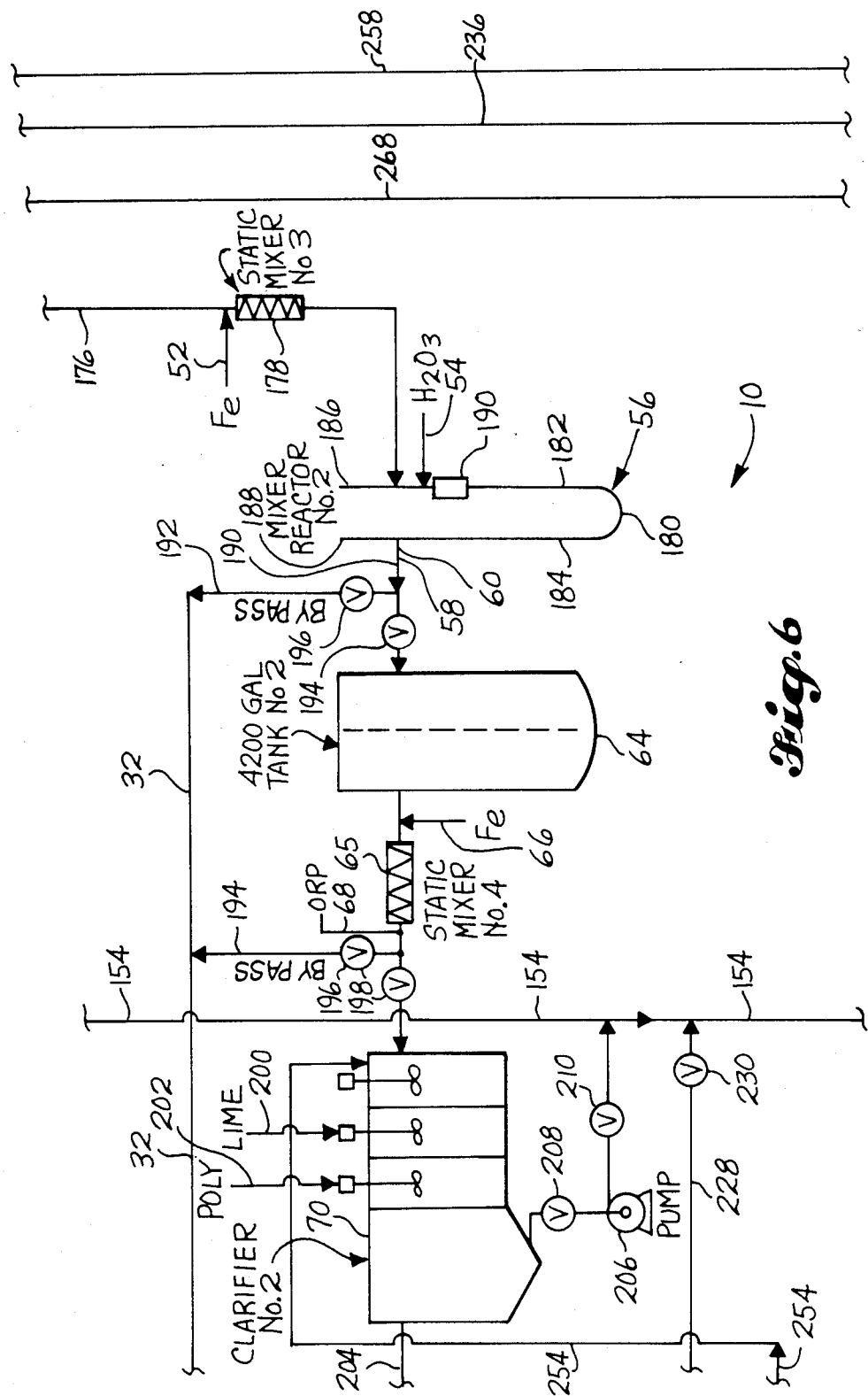
FIG. 6 is a more detailed schematic drawing of the middle portions of FIGS. 1 and 2.

Referring now to FIG. 6, ferrous sulfate is added to the waste stream at 52 where it is mixed into the waste stream by another static mixer 178. Then, the waste stream is transferred into the second mixer reactor which is shown generally at 56. The construction of the second mixer reactor 56 is similar to the construction of the first mixer reactor 22 shown and described in FIG. 4. Specifically, the second mixer reactor 56 is generally in the form of a U-shaped tube 180 having a pair of upwardly extending vertical portions 182, 184. Each vertical portion is open at its upper end 186, 188. Hydrogen peroxide is input into the waste stream at 54 and the waste stream passes through another static mixer 190 which is located in one vertical portion 182.

After leaving the second mixer reactor 56, as shown at 190, and at this point pH and ORP measurements are taken at 58, 60, the waste stream is transferred to another holding tank 64. Once agains, depending on the pH and ORP measurements, the waste stream may be recycled as shown at 192 back into recycle loop 32, thus sending the waste stream back to the holding tanks 14, 16, 18 at the start of the system 10. Such recycling is controlled by valves 194, 196, respectively.

As previously described, after leaving the second mixer reactor 56, the wastewater is held in the tank 64 for approximately one hour. Then, depending on the ORP measurements taken at 68, more ferrous sulfate may be added to the waste stream at 66 and mixed by the static mixer 65. Another recycle loop 194, controlled by valves 196, 198, provides recirculation capability at this point.

The second clarifier 70 is the same in construction as the first clarifier 40 shown in FIG. 4. Lime, as shown at 200, is first added to the waste stream to adjust its pH. Then, a polymer as shown at 202 is added to cause flocculation. The liquid waste stream effluent issues from the second clarifier 70 at 204. Sludge is removed by a pump 206, wherein sludge removal is controlled by valves 208, 210, respectively. The sludge is transferred to the sludge tank 44 shown in FIGS. 1 and 8.

Figure 7:
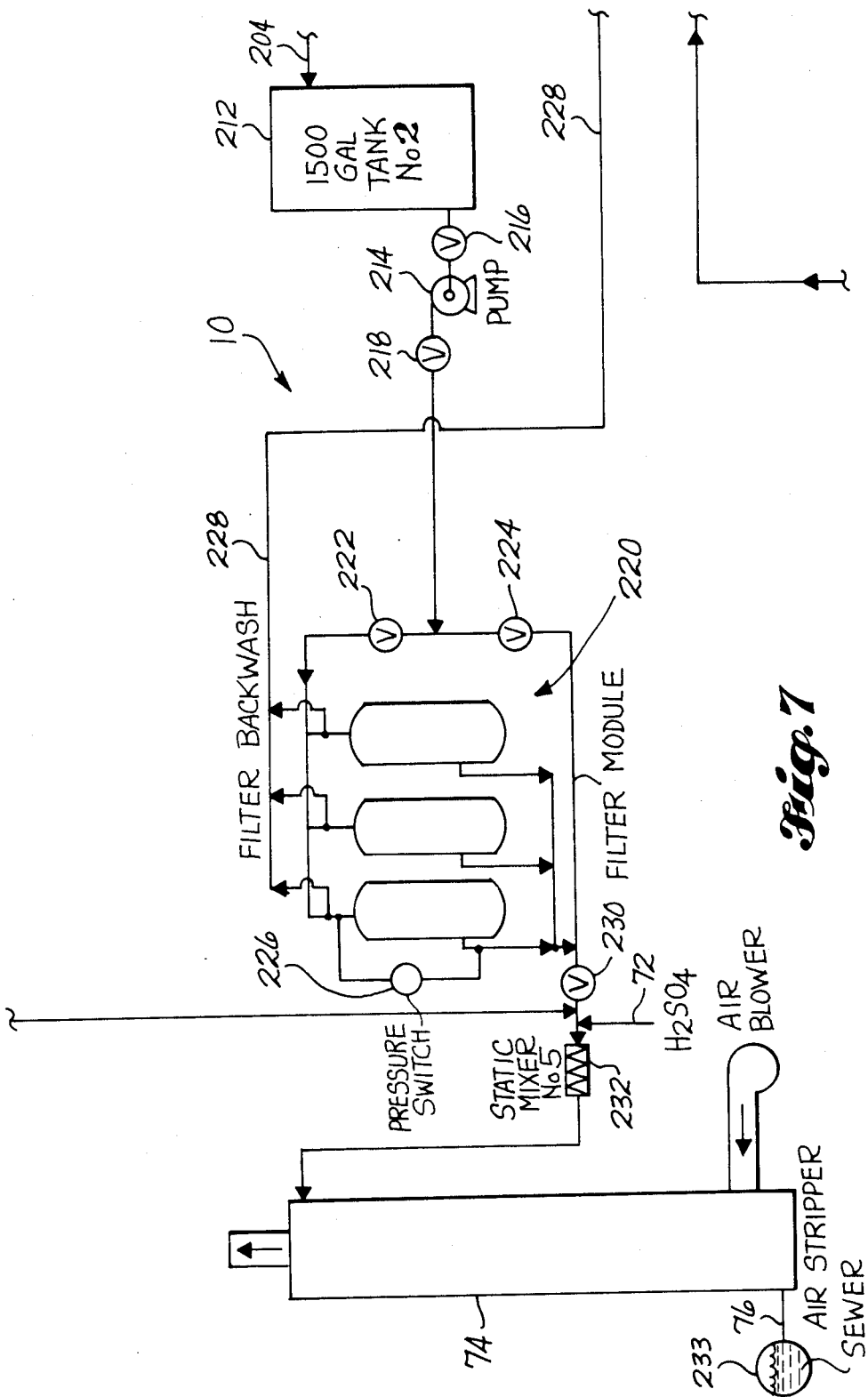
FIG. 7 is a more detailed schematic view of the right-hand middle portion of FIGS. 1 and 2.

Referring to FIG. 7, another tank 212 similar to the tank 160 shown in FIG. 5, is provided for receiving waste water effluent from the second clarifier 70 (shown in FIG. 6). A pump 214, controlled by valves 216, 218, pumps the waste stream into a sand filter apparatus generally shown at 220. The sand filter apparatus 220 is not shown in FIGS. 1 or 2, but would be familiar to a person skilled in the art as an apparatus which final filters the effluent. Use of the sand filter 220 in many respects is optional. Control of flow of the wastewater stream into the sand filter apparatus 220 is controlled by valves 222 and 224. A pressure switch 226 controls the flow of filter backwash into a recycle loop 228, which is connected to the sludge storage tank 44 (as shown at 228 in FIG. 6). Filter backwash is controlled by valve 230 in FIG. 6.

In FIG. 7, a valve 230 controls the flow of the waste stream whether or not it passes through the sand filter apparatus 220. Then, the pH of the waste stream is once again adjusted by adding sulfuric acid at 72. The acid is mixed into the waste stream by a mixer 232. Then, the waste stream is processed by the air stripper 74, which removes any remaining volatile organics in the waste stream such as toluene or methylene chloride. The construction of the air stripper 74 would be familiar to a person skilled in the art. After exiting the air stripper at 76, treatment of the waste stream is complete and the waste stream is dumped down the sewer 233.

Figure 8:
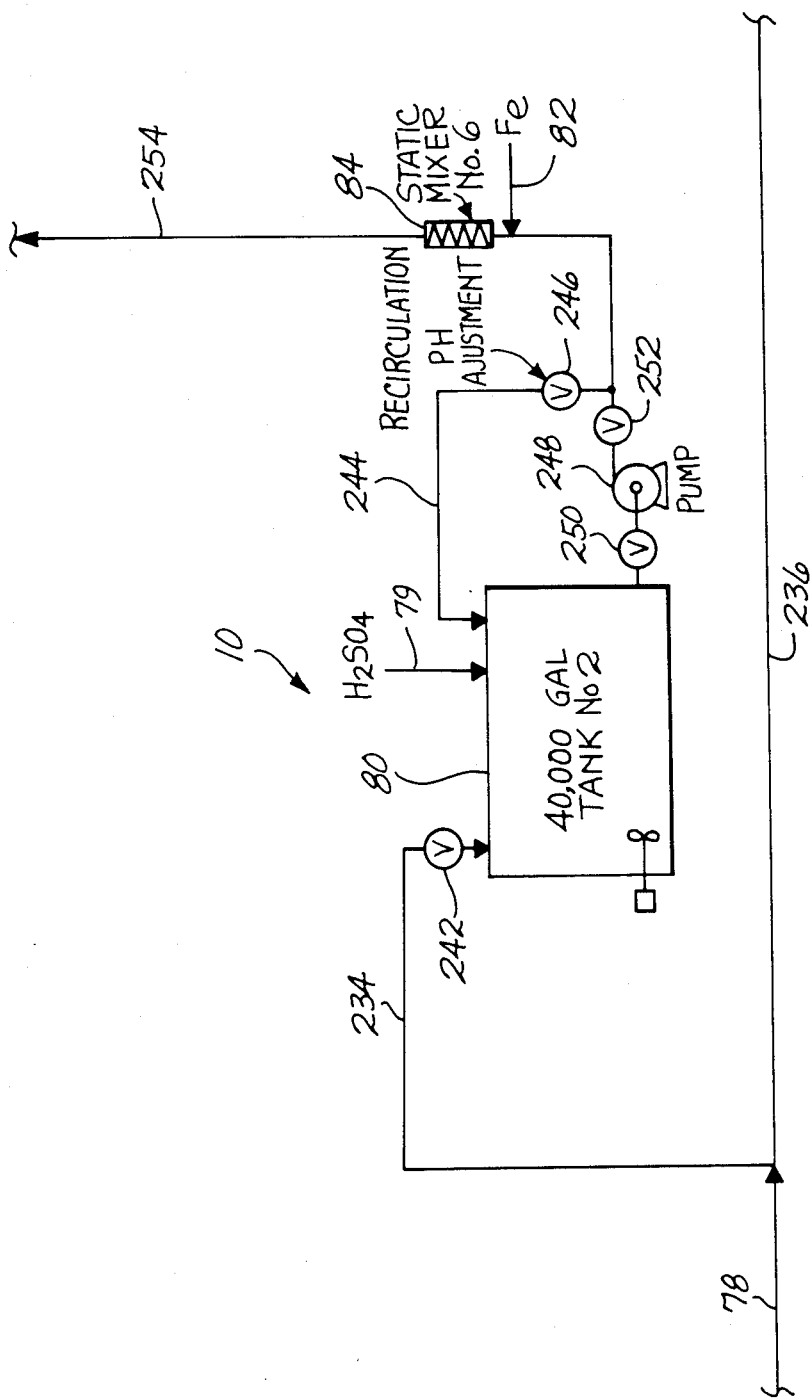
FIG. 8 is a more detailed schematic drawing of the central portion of FIGS. 1 and 2.

Addition of plating line wastewater to the system 10 is shown in FIG. 8. The plating line wastewater may be input into the tank 80 as shown at 234, or this wastewater may be circulated as shown at 236 in FIGS. 8, 9, 6 and 5, to the tanks 48, 50 in FIG. 5. Such circulation is controlled by valves 238 and 240 in FIG. 5. A valve 242 controls circulation of the plating line wastewater into the tank 80.

The operation of the system components shown in FIG. 8 is the same as that which was previously described for the tank 80 in FIG. 1. One difference, however, is the addition of a recycle loop 244 which may be utilized if it is necessary to readjust the pH of the plating line wastewater in the tank 80. Circulation through the loop 244 is controlled by a valve 246. Plating line wastewater is transferred from the tank 80 by a pump 248 controlled by valves 250, 252. This wastewater is transferred as shown at 254 in FIGS. 8 and 6, to the second clarifier 70 in FIG. 6. There, the wastewater is processed through the remaining portion of the second stage of the treatment process as was previously described.

Figure 9:
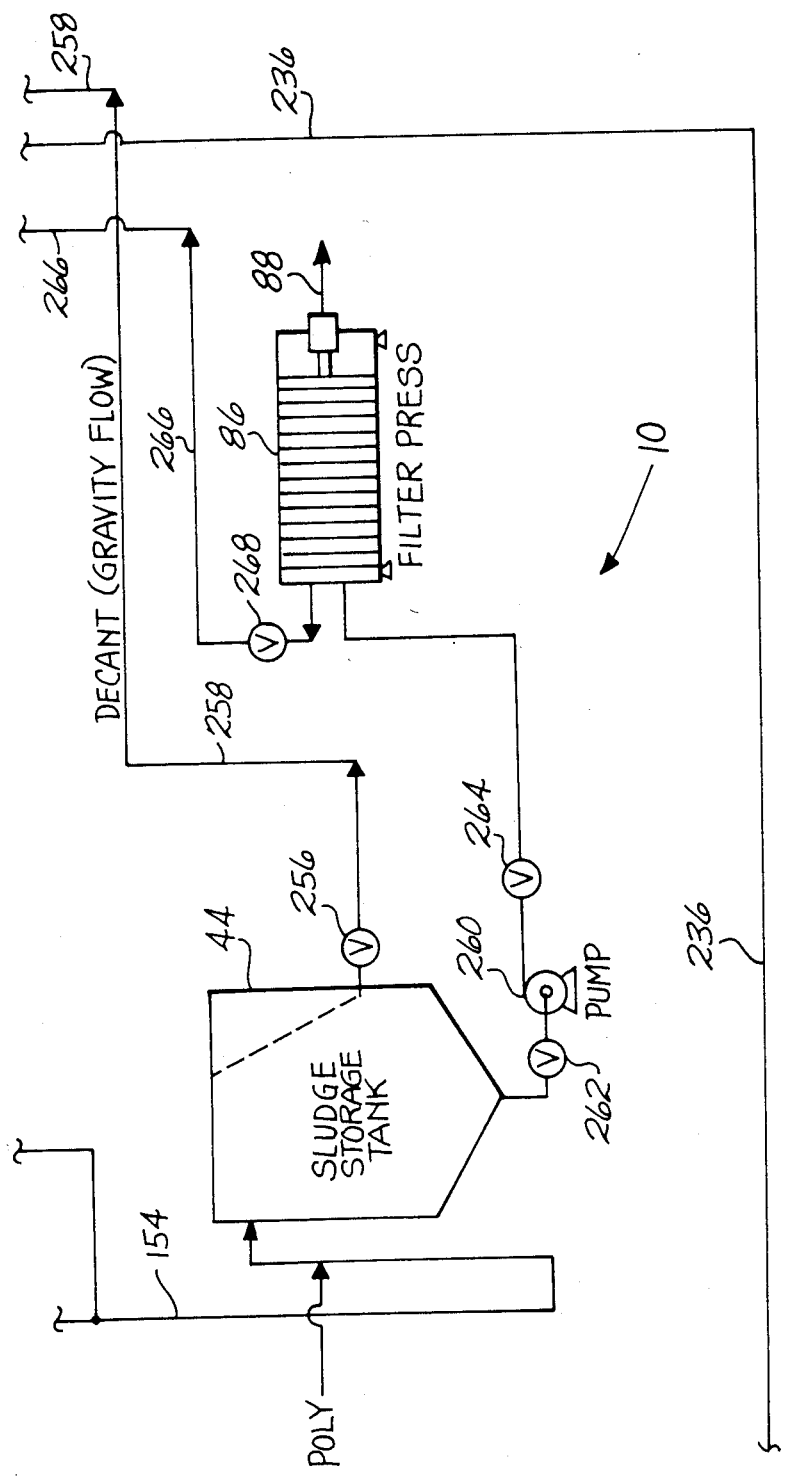
FIG. 9 is a more detailed schematic view of the lower left-hand portions of FIGS. 1 and 2.

Referring to FIG. 9, the sludge tank 44 and filter press 86 is shown therein. Water effluent from the sludge tank 44, controlled by a valve 256, is recirculated back to the holding tank 160 in FIG. 5, as shown at 258 in FIGS. 9, 6, and 5. A pump 260, subject to control by valves 262, 264, pumps sludge from the tank 44 into the filter press 86. There, dewatered sludge is removed from the filter press at 88 and any residual liquid effluent remaining after the filtering process is recirculated as shown at 266 to the tanks 48, 50 in FIG. 5. Such recirculation is controlled by a valve 286 in FIG. 9 and valves 270, 272 in FIG. 5.

Thus, a detailed description of the system 10 has been shown and described in FIGS. 3–9. As would be apparent to a person skilled in the art, many modifications could be made to the system without departing from the basic operation thereof. For example, the various valves denoted throughout the system could be many types of valves, including butterfly valves and one-way check valves. The above description is not meant to be limiting in any sense. The above description is provided only for exemplary purposes and it is to be understood that the invention is to be limited only by the claims which follow, in accordance with the doctrines of patent law claim interpretation.

What is claimed is:

1. In an airplane manufacturing operation, which creates a water waste stream or wastewater effluent in which is present certain toxic organics, including phenol, methylene chloride, toluene and other organics, and in which is present certain metals including cadmium, chromium, copper, lead, nickel, silver, zinc and other metals, a method of removing said toxic organics and said metals from said waste stream, comprising the following steps in sequence as defined below:

a. adjusting the pH of said waste stream to approximately 5.0; then b. continuously adding iron ions to said waste stream in an effective amount based on the phenol concentration in said stream; then c. continuously adding hydrogen peroxide to said waste stream in an effective amount based on the phenol concentration in said stream, wherein said hydrogen peroxide oxidizes said phenol, such oxidation being catalyzed by said iron ions, and wherein said waste stream is in a flowing condition when both said iron ions and said hydrogen peroxide are added thereto, and further, said hydrogen peroxide is added by using a mixer reactor having a tubular section through which said waste stream passes, said tubular section having an inlet for receiving said waste stream into said mixer reactor after said iron ions are added to said waste stream, and an outlet for delivering said waste stream from said mixer reactor, said mixer reactor further including a static mixer positioned in said tubular section, said mixer reactor still further including means for delivering said hydrogen peroxide into said tubular section at a location immediately upstream of said static mixer, and first vent means for venting said tubular section, said first vent means being located upstream of said location where said hydrogen peroxide is delivered into said tubular section, and second vent means for venting said tubular section, said second vent means being positioned downstream of said static mixer, and after using said mixer reactor; then d. adjusting the pH of said waste stream to within a range of 8.5 to 9.5; followed by
e. adding a polymer to said waste stream in an amount based on the concentration of said metals in said stream, wherein said polymer causes flocculation of said metals and produces sludge in said waste stream; then
f. clarifying said waste stream by removing said sludge; then
g. adjusting the pH of said waste stream to approximately 5.0; then
h. continuously adding iron ions to said waste stream in an amount based on the remaining phenol concentration in said stream; then
i. continuously adding hydrogen peroxide to said waste stream in an amount based on the remaining phenol concentration in said stream, wherein said hydrogen peroxide oxidizes said remaining phenol, such oxidation being catalyzed by said iron ions, and wherein said waste stream is in a flowing condition when both said iron and said hydrogen peroxide are added thereto, and further, said hydrogen peroxide is added by using a mixer reactor having a tubular section through which said waste stream passes, said tubular section having an inlet for receiving said waste stream into said mixer reactor after said iron ions are added to said waste stream, and an outlet for delivering said waste stream from said mixer reactor, said mixer reactor further including a static mixer positioned in said tubular section, said mixer reactor still further including means for delivering said hydrogen peroxide into said tubular section at a location immediately upstream of said static mixer, and first vent means for venting said tubular section, said first vent means being located upstream of said location where said hydrogen peroxide is delivered into said tubular section, and second vent means for venting said tubular section, said second vent means being positioned downstream of said static mixer, and after using said mixer reactor; then
j. adjusting the pH of said waste stream to within a range of 8.5 to 9.5; followed by
k. adding a polymer to said waste stream in an amount based on the concentration of any remaining metals in said stream, wherein said polymer causes flocculation of said remaining metals and produces still more sludge in said waste stream; then
l. clarifying said waste stream by removing said sludge produced in step (k.) from said waste stream; then
m. airstripping said waster stream to remove any remaining toxic organics therefrom.

2. The method of claim 1, including treating plating line wastewater from an airplane manufacturing operation, such wastewater including certain amounts of chromium, nickel, zinc, cadmium and copper, wherein treatment of such wastewater comprises:

adjusting the pH of said plating line wastewater to approximately 4.0;
adding iron ions to said plating line wastewater in an amount based on the concentration of said metals in said plating line wastewater;

followed by
mixing said plating line wastewater with said waste stream after step j of claim 1 above; and further followed by
treating said plating line wastewater as set forth in steps k, l and m in claim 1 above.

3. The method of claim 1 wherein adding iron ions to said waste stream as set forth in steps b and h includes adding ferrous sulfate ($FeSo_47H_2O$) to said waste stream.

4. The method of claim 3, wherein a minimum of 200 parts per million (ppm) of ferrous sulfate is added to said waste stream in step b, and wherein a minimum of 1000 ppm ferrous sulfate is added in step h.

5. The method of claim 1, including measuring the pH and oxidation reduction potential of said waste stream after step c, in order to determine the amount of said hydrogen peroxide which was unoxidized after step c, and recycling said waste stream through steps a, b and c to substantially oxidize said unoxidized hydrogen peroxide.

6. The method of claim 1, including measuring the oxidation reduction potential of said waste stream after step c, in order to determine the amount of said hydrogen peroxide which was unoxidized and adding iron ions to said waste stream after step c but before step d to substantially oxidize said unoxidized hydrogen peroxide, wherein said iron ions are added in an amount based on the concentration of said unoxidized hydrogen peroxide.

7. The method of claim 1, wherein adjusting the pH of said waste stream in step d includes adding lime to said waste stream.

8. The method of claim 1, including measuring the pH and oxidation reduction potential of said waste stream after step i, in order to determine the amount of said hydrogen peroxide which was unoxidized during step i, and recycling said waste stream through steps a–h to substantially oxidize said unodidized hydrogen peroxide.

9. The method of claim 1, including holding said waste stream in a holding tank for approximately one hour after step i, followed by measuring the oxidation reduction potential of said waste stream, in order to determine the amount of unoxidized hydrogen peroxide in said stream after said stream was held in said holding tank, and adding iron ions to said waste stream to substantially oxidize said unoxidized hydrogen peroxide wherein said iron ions are added in an amount based on the concentration of said unoxidized hydrogen peroxide.

10. The method of claim 1, wherein ajusting the pH of said waste stream in step j includes adding lime to said waste stream.

11. The method of claim 1, including adjusting the pH of said waste stream to approximately 7.0 after step l.

12. The method of claim 1, including sand filtering said waste stream after step l.

13. In a water waste stream or wastewater effluent in which is present certain toxic organics, including phenol, methylene chloride, toluene and other organics, and in which is present certain metals including cadmium, chromium, copper, lead, nickel, silver, zinc and other metals, a method of removing said toxic organics and said metals from said waste stream, comprising the following steps in sequence as defined below:

a. adjusting the pH of said waste stream to approximately 5.0; then
b. continuously adding iron ions to said waste stream in an effective amount based on the phenol concentration in said stream; then
c. continuously adding hydrogen peroxide to said waste stream in an effective amount based on the phenol concentration in said stream, wherein said hydrogen peroxide oxidizes said phenol, said oxidation being catalyzed by said iron ions, and wherein said waste stream is in a flowing condition when both said iron ions and said hydrogen peroxide are added thereto, and further, said hydrogen peroxide is added by
   using a mixer reactor having a tubular section through which said waste stream passes, said tubular section having an inlet for receiving said waste stream into said mixer reactor after said iron ions are added to said waste stream, and an outlet for delivering said waste stream from said mixer reactor, said mixer reactor further including
   a static mixer positioned in said tubular section, said mixer reactor still further including
   means for delivering said hydrogen peroxide into said tubular section at a location immediately upstream of said static mixer, and
   first vent means for venting said tubular section, said first vent means being located upstream of said location where said hydrogen peroxide is delivered into said tubular section, and
   second vent means for venting said tubular section, said second vent means being positioned downstream of said static mixer,
and after using said mixer reactor; then
d. adjusting the pH of said waste stream to within a range of 8.5 to 9.5; followed by
e. adding a polymer to said waste stream in an amount based on the concentration of said metals in said stream, wherein said polymer causes said flocculation of said metals and produces sludge in said waste stream; then
f. clarifying said waste stream by removing said sludge; then
g. air stripping said waste stream to substantially remove any toxic organics remaining in said waste stream.

14. In a water waste stream or wastewater effluent from a manufacturing operation in which phenol is present, a method of removing said phenol from said waste stream, including:
   continuously adding iron ions to said waste stream in an effective amount based on the phenol concentration in said stream, wherein said stream is in a flowing condition when said iron ions are added; followed by
   continuously adding hydrogen peroxide to said waste stream in an effective amount based on the phenol concentration in said stream, wherein said waste stream is in a flowing condition when said hydrogen peroxide is added thereto, and further, said hydrogen peroxide is added to said stream by
      using a mixer reactor having a tubular section through which said waste stream passes, said tubular section having an inlet for receiving said waste stream into said mixer reactor from said iron ions are added to said waste stream, and an outlet for delivering said waste stream from said mixer reactor, said mixer reactor further including
      a static mixer positioned in said tubular section, said mixer reactor still further including
      means for delivering said hydrogen peroxide into said tubular section at a location immediately upstream of said static mixer, and
      first vent means for venting said tubular section, said first vent means being located upstream of said location where said hydrogen peroxide is delivered into said tubular section, and
      second vent means for venting said tubular section, said second vent means being positioned downstream of said static mixer,
   and wherein
   said hydrogen peroxide oxidizes said phenol in said mixer reactor, said oxidation being catalyzed by said iron ions, so that said phenol is substantially removed from said waste stream upon exiting said mixer reactor outlet.

* * * * *

UNITED STATES PATENT AND TRADEMARK OFFICE
CERTIFICATE OF CORRECTION

PATENT NO. : 4,724,084

DATED : February 9, 1988

INVENTOR(S) : Max C. Pahmeier and Joseph D. Edwards

It is certified that error appears in the above-identified patent and that said Letters Patent are hereby corrected as shown below:

Column 4, line 40, "of", first occurrence, should be -- or --.

Column 6, line 63, "agains" should be -- again --.

Claim 8, column 10, line 40, "unodidized" should be -- unoxidized --.

Claim 10, column 10, line 53, "ajusting" should be -- adjusting --.

Claim 14, column 12, line 22, "from" should be -- after --.

Signed and Sealed this

Twenty-fifth Day of October, 1988

*Attest:*

DONALD J. QUIGG

*Attesting Officer*     *Commissioner of Patents and Trademarks*